(No Model.)
A. F. HUMPHREY.
COOKING UTENSIL.
No. 606,552. Patented June 28, 1898.
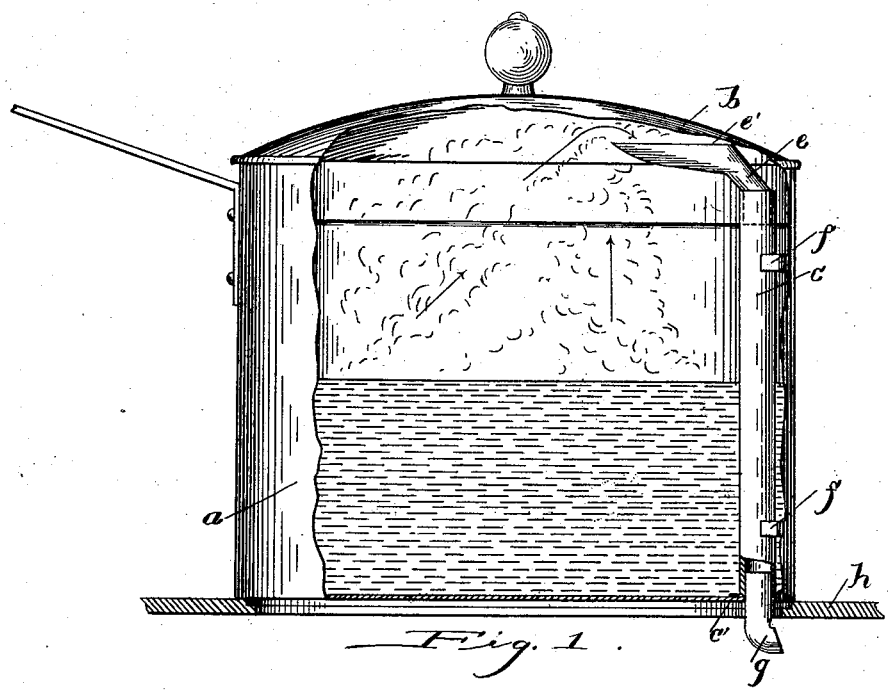
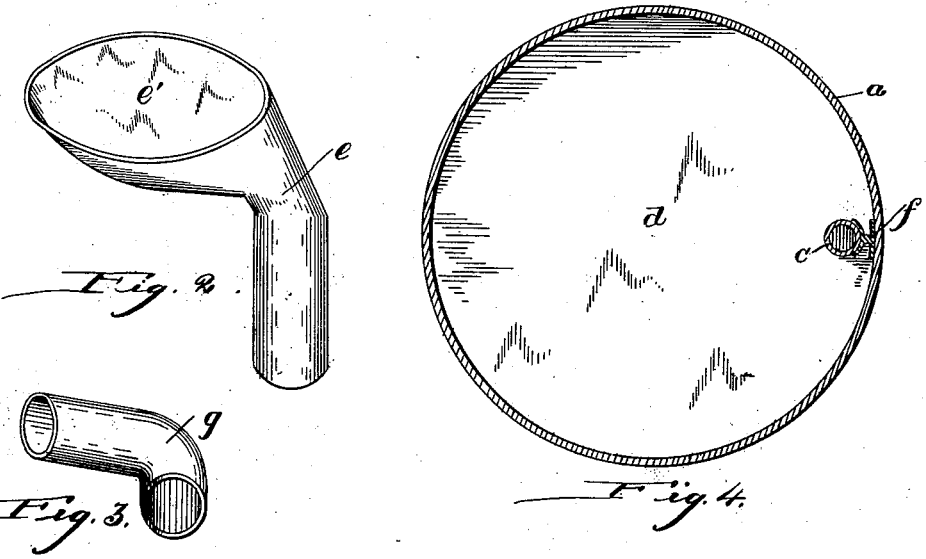
WITNESSES:
Francis H. Anglin
J. P. Appleman
INVENTOR
Alex. F. Humphrey.
BY
N. C. Evert & Co.
ATTORNEYS.

UNITED STATES PATENT OFFICE.

ALEXANDER F. HUMPHREY, OF ALLEGHENY, PENNSYLVANIA.

COOKING UTENSIL.

SPECIFICATION forming part of Letters Patent No. 606,552, dated June 28, 1898.

Application filed January 14, 1898. Serial No. 666,591. (No model.)

*To all whom it may concern:*

Be it known that I, ALEXANDER F. HUMPHREY, a citizen of the United States of America, residing at Allegheny, in the county of Allegheny and State of Pennsylvania, have invented certain new and useful Improvements in Cooking Utensils, of which the following is a specification, reference being had therein to the accompanying drawings.

This invention relates to certain new and useful improvements in cooking utensils, and has for its object novel and effective means whereby the fumes arising from the cooking food may be conducted downward into the stove and carried out through the chimney by the aid of the draft provided for the cooking-stove.

The principal features of my invention reside in the flue, which is arranged vertically at a suitable position within the vessel and which has inserted in its upper end a funnel or spout having an enlarged end or receiving-mouth through which the fumes are conducted into the vertical flue, where, owing to the draft in the stove, they are conducted up the chimney, together with the smoke and other volatile matter from the fire. In the lower end of this vertical flue is secured a short elbow with the opening of the same toward the chimney, so as to prevent any danger of a draft being created upwardly through the vertical flue of the vessel.

The invention finally consists in the novel construction, combination, and arrangement of the parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1 is a side view of the vessel constructed in accordance with my invention, the vessel being partly broken away to show the arrangement of the fume-conductor and the view also showing a portion of the stove-top in section. Fig. 2 is a perspective view of the funnel or receiving-mouth of the vertical flue. Fig. 3 is a perspective view of the elbow for conducting the fumes toward the outlet of the stove. Fig. 4 is a horizontal sectional view of the vessel.

Referring now to the drawings by reference-letters, $a$ represents the body portion of the vessel, which may be of any desired form and is provided with a lid $b$, conforming to the style of the vessel employed. Within this vessel is arranged a vertical flue $c$, which is preferably located at the side opposite to the handle, although it may be placed in any desired position or location within the vessel. This flue or conducting-pipe is provided at its base with an outwardly-extending flange $c'$, by means of which the same can be firmly secured to the base $d$ of the vessel, said base being provided with an aperture corresponding in position to the flue or conductor-pipe $c$. This flue or conductor-pipe extends upwardly in the vessel to a point almost at the top of the same and receives at its upper end a pipe $e$, which is formed with a funnel or flaring mouth $e'$, that extends inwardly toward the center of the vessel. The said pipe $e$ is preferably made of the size that will fit neatly within the flue or conductor-pipe $c$, while the latter may be readily retained steady in its position by means of clamps $f$, secured to the inner face of the walls of the vessel and engaging the outer face of the flue or conductor-pipe $c$.

In the lower end of the flue or conductor-pipe $c$ is inserted an elbow $g$, which is likewise of a size that will fit neatly within the flue or conductor-pipe, and when in its position is turned so as to have its opening toward the chimney for the stove. This elbow projects downwardly through the opening in the stove-top $h$ and serves to carry the fumes downward into the space within the stove, where they may be readily carried out through the flue of the stove by the aid of the draft generated in the stove through its flue.

It will be noted that various changes may be made in the details of construction without departing from the general spirit of my invention.

Having fully described my invention, what I claim as new, and desire to secure by Letters Patent, is—

1. In combination with a cooking vessel, a vertical flue or conductor-pipe arranged therein and secured by clamps to the inner wall of the vessel, a pipe engaging in the upper end of said flue or conductor-pipe, said pipe being provided with a funnel or flaring end and an elbow fitting within the flue or conductor-pipe at its lower end, and projecting downwardly into the space within the stove, substantially as shown and described.

2. In combination with a cooking vessel, a vertical flue or conductor-pipe arranged therein and extending upward to a point near the rim of the vessel, said flue being adapted to receive a pipe at its upper end, which is provided with an inwardly-projecting funnel or flaring mouth, said flue or pipe being also adapted to receive an elbow-pipe at its lower end, said elbow projecting downward into the space within the stove, and thereby conducting the fumes from the vessel to the point where they may be engaged by the draft within the stove, substantially as shown and described.

In testimony whereof I affix my signature in the presence of two witnesses.

ALEXANDER F. HUMPHREY.

Witnesses:
JOHN NOLAND,
THOS. M. BOYD, Jr.